UNITED STATES PATENT OFFICE.

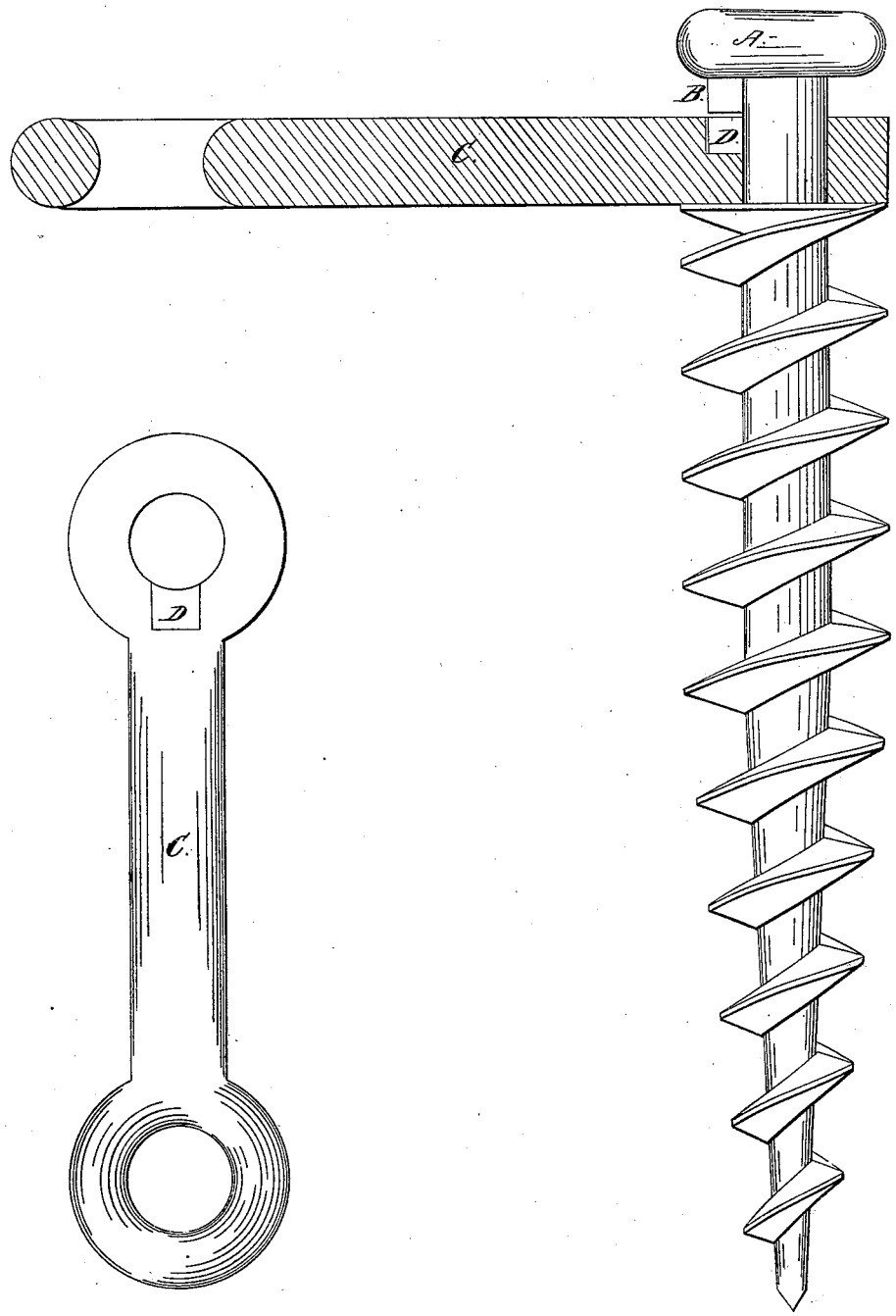

O. HYDE, OF BENICIA, CALIFORNIA.

SCREW-PICKET.

Specification of Letters Patent No. 20,715, dated June 29, 1858.

*To all whom it may concern:*

Be it known that I, OLIVER HYDE, of Benicia, county of Solano, State of California, have invented a new and Improved Tethering-Stake for Domestic Animals and other Purposes; and I do hereby declare that the following is a full and exact description.

The nature of my invention consists in attaching or casting a swivel on the top of a screw so that when placed in contact with the head of the screw it becomes the lever to turn it in or out of the ground, and when dropped, or not held up to the head it is the swivel and will turn freely without turning the screw.

I cast a screw of a size suitable to the purpose for which it is to be applied with a head on it A in the accompanying drawing under the head is cast a small lug or projection B. Between the head, and body or thread of the screw I cast the swivel or lever C one end having an eye or hole that will fit loosely on the neck of the screw, and at the other end an eye rounded inside and out to attach a rope to. On the upper side of C and opening into the hole close to the neck of the screw a recess D is left that will fit easily on the lug B, so that when C is lifted up to the head A the recess D catches on the lug B and thereby becomes the lever to turn the screw with. But when not held up it drops clear of the lug, plays loose on the screw and in combination with it becomes a tethering screw or fast for domestic animals, and other purposes.

What I claim as my invention and wish to secure by Letters Patent is—

The application of a loose swivel to the top of a coarse threaded screw in combination with a catch or lug under the head of the screw so that, in connection, the swivel becomes the lever to turn the screw into the ground.

OLIVER HYDE.

Witnesses:
 GEO. H. RIDDELL,
 W. W. ALLEN.